United States Patent [19]

Bennett

[11] Patent Number: 4,703,742
[45] Date of Patent: Nov. 3, 1987

[54] AIR-GAS MIXING DEVICE WITH DUAL-CONTROL FUEL VALVE

[75] Inventor: David E. Bennett, Lake Lillian, Minn.

[73] Assignee: Impco Carburetion, Inc., Cerritos, Calif.

[21] Appl. No.: 917,381

[22] Filed: Oct. 9, 1986

Related U.S. Application Data

[63] Continuation-in-part of Ser. No. 778,482, Sep. 20, 1985.

[51] Int. Cl.$^4$ .............................................. F02B 7/00
[52] U.S. Cl. .................................... 123/577; 123/527
[58] Field of Search ................... 123/527, 27 GE, 575, 123/577

[56] References Cited

U.S. PATENT DOCUMENTS

| | | | |
|---|---|---|---|
| 2,856,599 | 7/1959 | Ensign | 123/527 |
| 3,545,948 | 12/1970 | Baverstock | 48/184 |
| 3,741,737 | 6/1973 | Jones | 123/527 |
| 3,846,094 | 11/1974 | Baverstock | 48/189.1 |
| 4,020,810 | 5/1977 | Baverstock | 123/527 |
| 4,098,248 | 7/1978 | Todd | 123/27 GE |
| 4,449,509 | 5/1984 | Young | 123/577 |
| 4,513,727 | 4/1985 | Lagano et al. | 123/525 |

Primary Examiner—E. Rollins Cross
Attorney, Agent, or Firm—Thomas A. Seeman

[57] ABSTRACT

An air-gas mixing device of the type used to mix air and gaseous fuel as a gaseous fuel charge for an internal combustion engine and particularly suitable for use with engines operating generators and the like at constant speed. Fuel and air valves for controlling the air/fuel mixture are coupled together and actuated by a fluid motor in response to a fluid pressure signal, derived from the intake manifold pressure of the engine, acting on the diaphragm of the fluid motor. The fuel valve is also independently actuated by a second fluid motor, mounted to the diaphragm of the first fluid motor, in response to ambient air pressure which is applied to the second fluid motor upon a sudden increase in engine load demand to enlarge the opening of the fuel valve and thereby enrich the air/fuel mixture to prevent a significant falloff in engine speed. Because of the dual control of the fuel valve, the device is capable of providing a more optimum lean air/fuel mixture for better fuel economy and emissions control during normal operating conditions while being able to quickly enrich the fuel mixture in response to sudden increases in load demand.

17 Claims, 7 Drawing Figures

AIR-GAS MIXING DEVICE WITH DUAL-CONTROL FUEL VALVE

This application is a continuation-in-part of copending application Ser. No. 778,472, filed Sept. 20, 1985.

BACKGROUND OF INVENTION

This invention relates generally to air-gas mixing devices of the type used to mix air and gaseous fuel, such as gaseous LPG or natural gas, as a gaseous fuel charge for an internal combustion engine; and more particularly of the type in which air and gas valves for the controlling the air/fuel ratio of the fuel charge are actuated in response to to a pressure signal derived from the intake manifold pressure of the engine.

Mixing devices for mixing air with a gaseous fuels are well known. Such a device is commonly attached, together with a butterfly valve, to an intake manifold of an internal combustion engine in lieu of a conventional liquid fuel carburetor when it is desired to operate the engine with gaseous fuel. In operation, the device typically mixes in a mixing chamber air and gaseous fuels in proper proportion for a particular engine load in response to engine intake manifold pressure, which is indicative of engine load requirements, and discharges and mixture in the intake manifold. Air and gas valves within the device control the amount and mixture of the air/fuel charge.

In one such device, shown in U.S. Pat. No. 3,545,948, the air and gas valves are actuated in unison by a diaphragm operated by a pressure signal derived from the intake manifold pressure. The diaphragm opens the valves in response to negative manifold vacuum pressure, and the size and degree of the valve openings, and therefore the air/fuel mixture, at any given manifold pressure are predetermined for the particular fuel and engine on which the device is installed.

A problem with such known air-gas mixing devices is that once installed, the devices cannot feasibly accommodate different gaseous fuels. This is because the fuel valve when opened cannot be independently adjusted to enrich or lean the air/fuel mixture for the particular fuel being utilized. This problem occurs most commonly in the oil refining industry where such devices are installed in industrial engines that are fueled with gaseous fuels left over from the cracking processes. These gaseous fuels vary in their BTU content, depending, for example, on whether the gaseous fuel arises from cracking petroleum for jet fuel or heating oil. Because of the difference in BTU content, it is necessary to adjust the air/fuel mixture for any given engine load when the fuel is changed, which may occur frequently or even continuously. An attempt has been made to accomplish this by providing a mechanical adjustment screw to adjust fuel flow upstream of the fuel inlet of the device, but this is time consuming and the mechanical adjustment screw wears out in time.

Another problem is that such devices do not always provide the most optimum air/fuel mixture for all ranges of engine performance. This is because the air and fuel valves are controlled solely by a fluid pressure signal derived from intake manifold pressure. Although this pressure signal is an indicator of engine load and provides an effective air/fuel mixture for engine performance under most engine conditions, the pressure signal alone cannot be relied upon to provide an optimum air/fuel mixture for all ranges and conditions of engine performance. To accomplish this, it is preferable to adjust the air/fuel mixture from time to time by means of a second control signal from a feedback controller of the type that monitors engine performance in response to inputs from speed, oxygen, vacuum and/or other sensors of engine performance and emits a control signal in response to these sensors. Attempts have been made to adjust the air/fuel mixture by providing an adjustable air by-pass around the fuel valve to lean out a predetermined enriched mixture in response to such a control signal, or by adjusting the pressure of the gaseous fuel to the mixing chamber in response to the control signal. However, these solutions suffer from reliability problems and have inherent time delays which adversely affect engine performance.

Another problem with known air-gas mixing devices is that the devices cannot operate an engine effectively with a lean air/fuel mixture and quickly and efficiently enrich the fuel mixture upon sudden increases in engine load demand. This is particularly important in generator applications where it is desirable to operate the generator with a lean air/fuel mixture at constant speed for better fuel economy and emissions control during normal load conditions while being able to quickly enrich the fuel mixture upon a sudden increase in load demand to prevent any fall off in speed or stalling of the engine as a result of the load increase.

SUMMARY OF THE INVENTION

Accordingly, it is an object of this invention to provide an air-gas mixing device which may be quickly and remotely adjusted to handle a wide variety of gaseous fuels for a particular engine application.

It is an another object of this invention to provide an air-gas mixing device with air and gaseous fuel valves actuated in unison in response to a first control signal derived from engine intake manifold pressure and with the fuel valve also being remotely independently actuated by a second control signal for adjustment of the fuel valve while being actuated by the first control signal.

Another object of this invention is to provide an air-gas mixing device with a diaphragm actuated air and fuel valves actuated in response to a fluid pressure signal derived from intake manifold pressure of an internal combustion engine and with the fuel valve also being remotely independently adjusted by a feedback control signal from a feedback controller for adjusting the air/fuel mixture in response to engine output conditions.

Another object is to provide an air-gas mixing device which is particularly suitable for operating an internal combustion engine in generator applications by providing a lean air-fuel mixture for better fuel efficiency and emissions control during normal load conditions while being able to rapidly enrich the fuel mixture upon a sudden increase in load demand to prevent any significant falloff in engine speed caused by the sudden load demand.

Still another object of this invention is to provide an air-gas mixing device which is economical and feasible to manufacture.

In accordance with these objects, the invention comprises an air-gas mixing device of the type used to mix gaseous fuel with air as a fuel mixture or charge for an internal cmbustion engine. The device has a housing with an air inlet, a fuel inlet and an air-fuel mixture discharge outlet downstream of the air inlet. The housing is adapted to be attached to an engine intake manifold through an adapter having an included butterfly or throttle valve such that themixture is discharged into the intake manifold in response to the position of the butterfly valve. Air and gaseous fuel valves actuated by an actuating means comprising a fluid motor respectively control the amount and the mixture of the air and fuel discharge from the device. The air and fuel valves are coupled to a flexible diaphragm and are actuated in unison by the diaphragm which is moved in response to a fluid pressure signal derived from the engine intake manifold pressure. The degree to which the air and fuel valves are opened for any given intake manifold pressure is predetermined for the particular fuel and engine application with which the device is utilized to provide an appropriate air/fuel mixture for the particular engine application.

Two embodiments of the device are shown and described. In the first embodiment, the fuel valve is also independently actuated by a stepper motor mounted to the diaphragm in response to a second control signal, such as from a remote feedback controller, to provide an independent actuator means for the fuel valve while the valve is also being actuated by the diaphragm. With the use of the stepper motor, the fuel valve may be remotely and independently adjusted to modify the air/fuel mixture for different gaseous fuels and for a more optimum air/fuel ratio for any given engine operating condition.

The second embodiment of the invention is for use primarily with internal combustion engines for driving generators arfd the like at constant speed with a lean air/fuel mixture. Advantageously, the device is able to quickly enrich the air-fuel mixture upon a sudden increase in load demand to prevent any significantly fall off in engine speed. In this embodiment, a second fluid motor replaces the stepper motor of the first embodiment and raises the fuel valve a fixed amount to enrich the air-fuel mixture when a fluid pressure control signal is applied to the fluid motor in response to a sudden increase in load demand. This prevents a significant falloff in engine speed, which would otherwise occur. After the speed of the generator is stabilized for the increase in load, the fuel valve is lowered to return the air-fuel mixture to a lean condition.

In both embodiments, the housing may be arranged to receive inlet air through the top of the housing or through the side of the housing, when it is desirable for space and other considerations.

The invention accordingly comprises the feature of construction, combination of elements and arrangements of parts which will be exemplified in the construction hereinafter set forth, and the scope of the invention will be indicated in the claims.

BRIEF DESCRIPTION OF THE DRAWINGS

For a fuller understanding of the nature of the objects of the invention, reference should be made to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
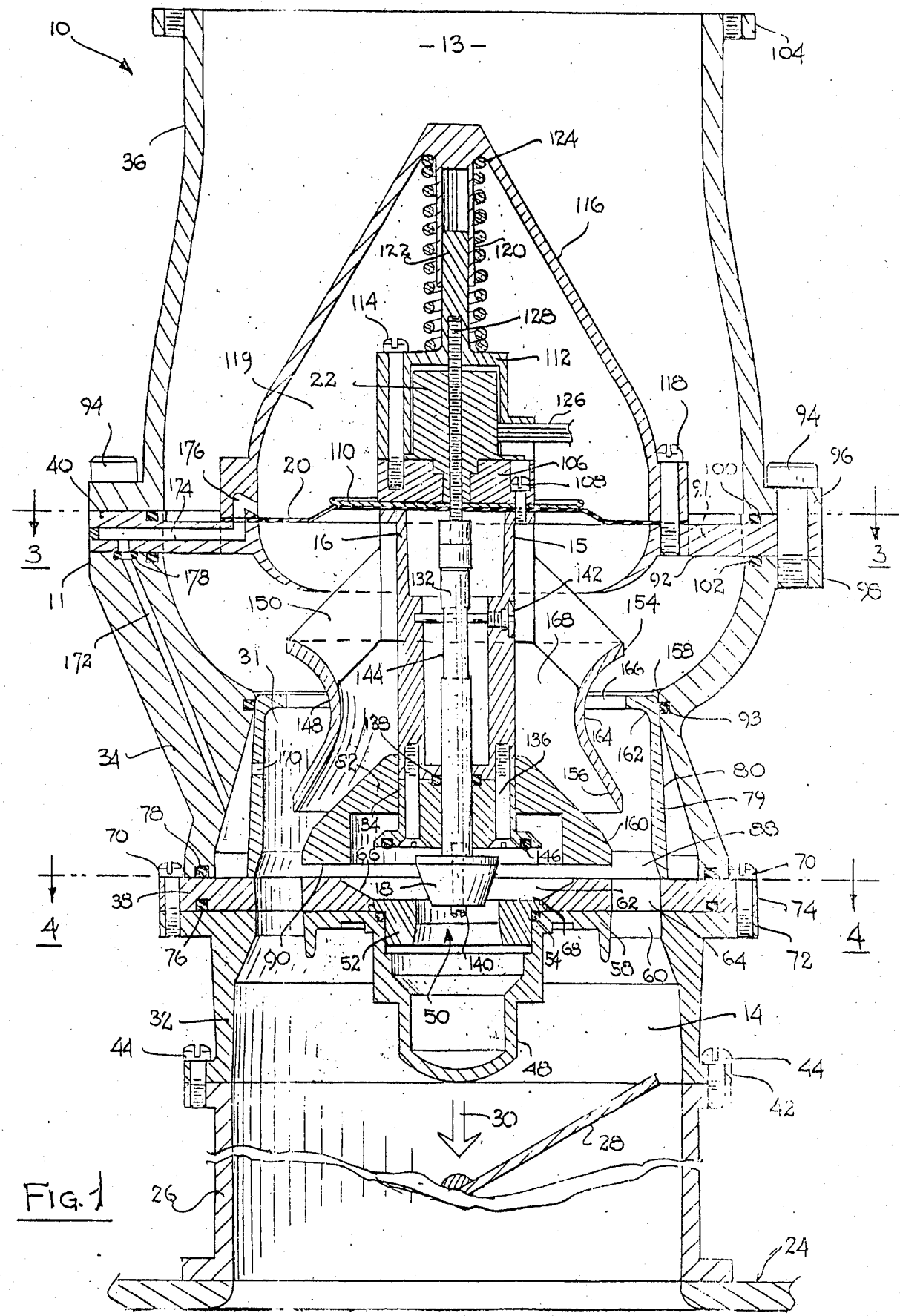
FIG. 1 is side elevation, in cutaway axial cross-section, of a first embodiment of the invention with the air and gas valves in an open position.

Referring now to the drawings in detail, there is illustrated in FIGS. 1 to 5, a first embodiment of an air-gas mixing device 10 comprising this invention.

Referring first to FIGS. 1 through 4, as will be explained more fully in subsequent paragraphs, in a first embodiment, the air-gas mixing device 10 is formed with a symmetrical housing 11 having an air duct 12 extending through the housing from an air inlet 13 at the upper end of the housing to a an air/fuel mixture discharge outlet 14 at the bottom of the housing. Centrally located within the housing is an axially movable, composite valve carrier or member 15 with an included air valve element 16 and fuel valve head 18, comprising elements of respective air and fuel valves, for controlling the flow of air and fuel respectively and thereby the air/fuel mixture through the discharge outlet 14. The air valve element and fuel valve head are actuated in unison of movement of a diaphragm 20 which moves the composite valve member in response to a fluid pressure signal derived from an engine intake manifold. The fuel valve head is also independently actuated by a stepper motor 22 mounted to the diaphragm for varying the rate of fuel flow in response to a control signal from a feedback controller receiving inputs from a plurality of sources for measuring engine performance such as an oxygen sensor for measuring oxygen content in an exhaust manifold, a speed sensor for measuring engine speed, and a vacuum sensor for measuring intake manifold vacuum. The device is shown with the composite valve member 15, and the air and gas valves, in an open position in FIG. 1. and in a closed position in FIG. 2.

Describing the device with greater particularly, the device is typically mounted to an air intake conduit means of an engine such as an air intake manifold 24 through an adapter 26. A conventional butterfly-type throttle valve 28, only a portion of which is shown, is pivotably mounted to the adapter and serves to regulate the rate of flow through the mixture discharge outlet 14 at the bottom of the housing. The mixing device, with a butterfly valve, constitutes a carburetor. Arrow 30 indicates the axis of oulet flow from the mixing device toward the engine intake manifold. The pressure in the intermediate portion 31 of the air duct is a derivative and function of the pressure in the engine intake manifold, although it is not usually identical thereto while the engine is in operation.

The housing includes a base 32, an intermediate housing section 34, and an upper housing section 36. A spacer plate 38 is located between the base 32 and the intermediate section 34, and a diaphragm mounting plate 40 is located between the upper section 36 and the intermediate section 34. Bosses 42 are provided at the lower end of the base for connection of the base to the adapter by screws 44.

A threaded fuel supply port 46 for connection to a fuel supply source, not shown, is formed in the side wall of the base and is in fluid communication with a fuel inlet conduit 48 which extends from the port to the central portion of the mixing device where it terminates in an upwardly facing inlet 50. (The structure of the fuel supply port and fuel inlet conduit may be more easily visualized by referring to the alternate housing arrangement of FIG. 5 which shows a side view of the conduit). A fuel valve seat 52 is removably positioned within the fuel inlet, and an O-ring 54 is positioned on an annular shoulder along the upper corner of the wall of the valve seat opening to seal the wall against gaseous fuel leakage. The fuel valve seat together with the fuel valve head constitute a fuel valve for controlling the fuel flow from the fuel inlet and are configured in shape and size for the particular engine application in which the device is intended to be installed.

An annular platform 58 extends about the fuel inlet opening to the interior sidewall of the base, and arcuate passages 60 are provided between the platform and the sidewall of the base 32 for passage of fuel and air through the base.

The spacer plate 38 has a central opening 62 overlaying the fuel inlet and the valve seat 52 for passage of fuel from the fuel inlet and has arcuate discharge passages 64 along its perimeter suitably positioned to overlay the discharge passages 60 in the support platform of the base portion of the housing for the passage of fuel and air through the spacer plate and the support platform. The central opening 62 has a tapered sidewall 66 to facilitate the flow of gaseous fuel from the fuel inlet to the discharge passages 64 and the inner end of the sidewall is stepped with a notch 68 to receive a corresponding stepped portion of the fuel valve seat 52 and to thereby retain the valve seat within the valve seat opening. The spacer plate is clamped between the base 32 and intermediate section 34 of the housing by screws 70 extending through flanges 72, 74 along the top of the base and the bottom of the intermediate section 34 respectively. O-rings 76, 78 respectively positioned within annular grooves along the lower surface of the spacer plate and along the lower surface of the intermediate section seal the juncture.

Located within the housing and clamped to the top of the spacer plate 38 is a symmetrical, removable core member 79 having an upright wall 80 and an integral, interior conical section 82 with a central opening to slidably receive the lower end of the composite valve member 15 and retain it in axial alignment. The upright wall 80 is connected to the conical section 82 by connecting bridges located on opposite ends of the base of the conical wall section, and arcuate discharge passages 88 are provided between the bridges and between the perimeter of the conical wall section and the upright wall 80 for passage of air and fuel. The air discharge passages 88 overlay the air/fuel discharge passages 64 in the spacer place and the discharge passages 60 in the base portion for discharge of air and fuel to the discharge outlet 14. Both the upright wall 80 and the conical wall 82 are impermeable structures. Importantly the base portion 90 of the conical wall section is raised slightly to provide a gap between the conical section and the spacer plate for communication of fuel flow from the fuel inlet to the discharge passages 64 in the spacer plate. A plurality of foot pads, not shown, extend from the base of the conical section about the periphery of the section to the top of the spacer plate to prevent the central portion of the section from flexing in response to vacuum pressure. The core is clamped to the top of the spacer plate by contact of the upright wall 80 with the interior wall of the intermediate housing section 34 when the intermediate section is fastened to the base 32. Alternatively, the core member may be fastened to the base by screws, not shown, extending through a flange on the bottom of the core member at the base of the upright wall 80, through the spacer plate and into the base. An O-ring 93 is located in an annular groove along the inner wall of the intermediate housing section at the point of contact with the upright wall 80 to seal the point of contact.

Figure 3:
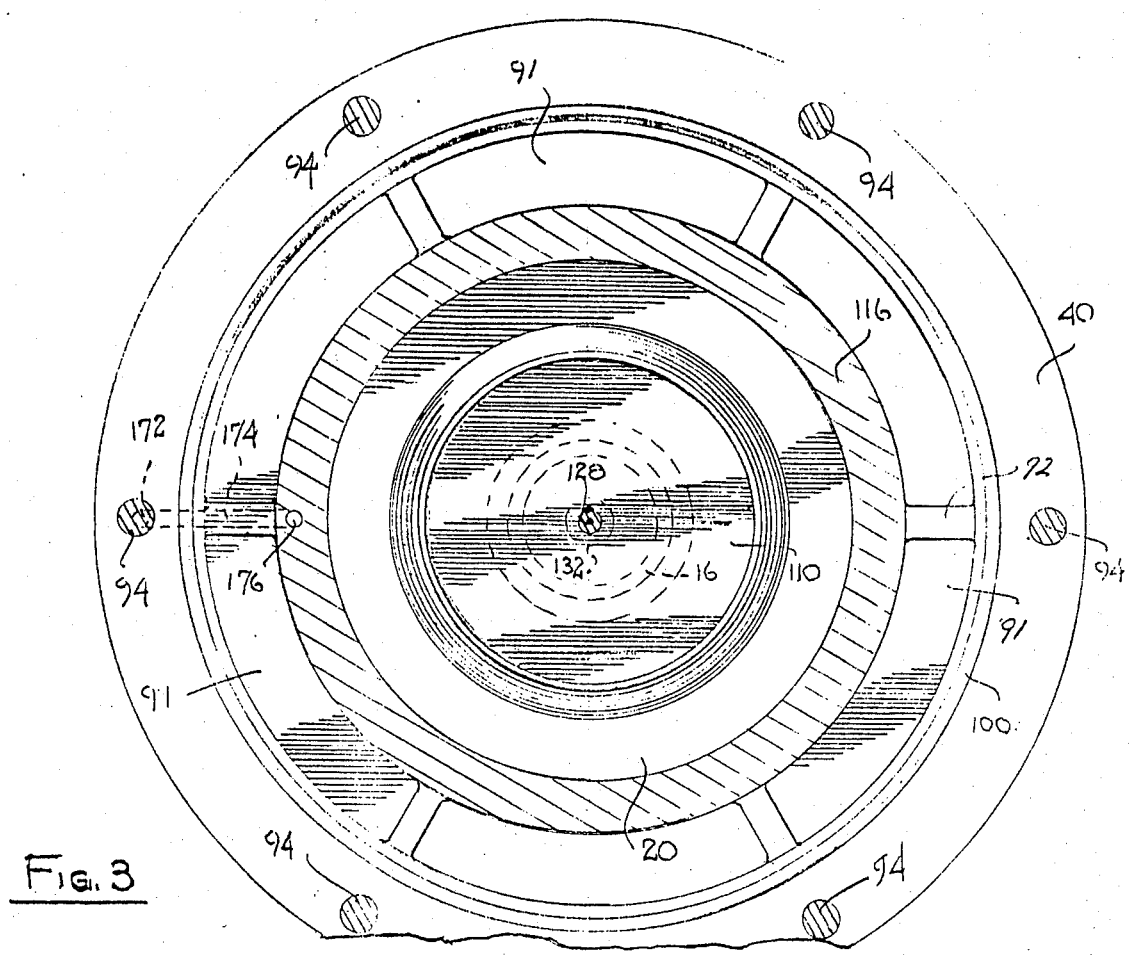
FIG. 3 is a cross-sectional view taken along the line 3—3 of FIG. 1.
Figure 4:
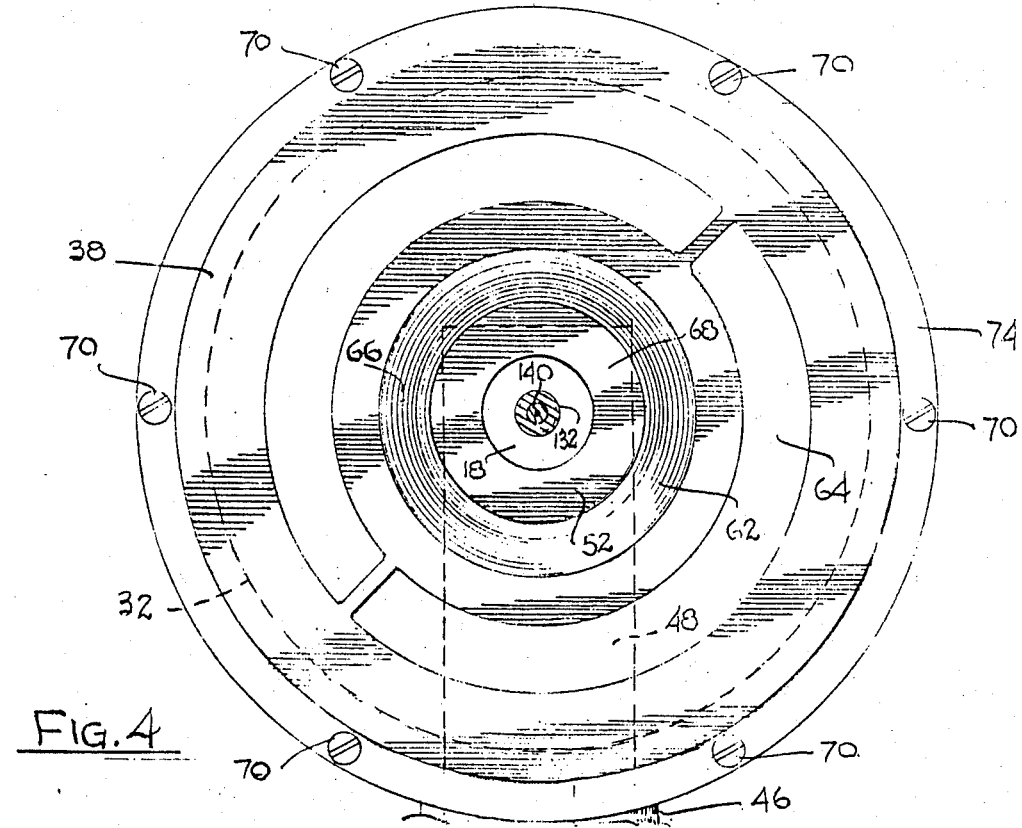
FIG. 4 is a cross-sectional view taken along the line 4—4 of FIG. 1.

The diaphragm mounting plate 40 is clamped between the upper housing section 36 and the intermediate housing section 34 by screws 94 extending through flanges 96, 98 on the respective members. O-rings 100, 102 placed respectively within annular grooves in the support plate and in the top wall surface of the intermediate housing section seal the adjoining members. A plurality of arcuate air passages 91, as best seen in FIG. 3, extend through the mounting plate adjacent to the wall of the housing for passage of air through the mounting plate. The passages are separated by radial connecting struts or arms 92. The central portion of the diaphragm mounting plate 40 is dish-shaped with an enlarged opening for receipt of the diaphragm and the composite valve member 15.

The upper housing section 36 is open at the top for the receipt of air into the mixing device and the opening constitutes the air inlet 13. An air filter, not shown, is preferably attached to the top of the housing to filter incoming air, and a flange 104 with screw mounting holes is provided along the top rim of the upper section for attachment of the air filter or for attachment of an air filter adapter, not shown.

The composite valve member 15 is operatively mounted to the diaphragm 20 by being clamped to the diaphragm with the diaphragm located between the top of air valve element 16 and a support block 106 for the stepper motor 22 by screws 108 extending through the support block and threaded to the air valve element 16. A diaphragm back-up plate 110 is positioned between the diaphragm and stepper motor support block to reinforce the diaphragm in this area. The stepper motor is housed within a stepper motor housing 112 that is fastened to the support block 102 by a pair of screws 114.

A dome-like cover 116 is positioned over the stepper motor housing and fastened to the diaphragm mounting plate 40 inwardly of the air passages 91 by mounting screws 118 threaded to the mounting plate. The diaphragm 20 is clamped between the cover and the mounting plate along the perimeter of the diaphragm, and a sealing gasket located underneath and in contact with the diaphragm seals the space 119 above the diaphragm and underneath the cover substantially against air leakage. This space 119 above the diaphragm and benath the cover 116 is an actuation chamber for actuating the diaphragm. The cover 116 has a downwardly extending sleeve 120 and is positioned over a mating alignment post 122 extending upwardly from the top of the stepper motor housing 112 to maintain the upper end of the composite valve member 15 in axial alignment during vertical movement. Spring 124 located between the stepper motor housing 112 and the cover 116 biases the composite valve member 15 downwardly toward its closed position.

The stepper motor 22 receives an electrical control signal from a feedback controller, not shown, through an electrical conduit 126. A worm screw 128 extending through the central axis of the stepper motor is moved axially in response to the signal to raise or lower the operatively connected fuel control head 18, and thereby actuate the fuel valve. The worm screw is fastened to the upper end of a connecting rod 132 such that the worm screw is prevented from rotating relative to the connecting rod. The connecting rod extends through a hollow core in the air valve element and through a central opening in an end cap 134 attached to the bottom of the air valve element by screws 136. A circular flexible seal 138 is provided in an enlarged recess at the interface of the air valve element 16 and end cap 134 for sealing contact with the connecting rod. The fuel valve head 18 is removably secured to the bottom end of the connecting rod by screw 140. A rotation prevention screw 142 extends through a longitudinal slot 144 in the connecting rod to prevent the rod and connected worm screw from rotating which causes the worm screw to move in an axial direction when the stepper motor is operated. The longitudinal slot 144 is of sufficient length to permit the connecting rod to be moved axially by the stepper motor for a full predetermined travel of the fuel valve head 18.

An O-ring 146 is provided within an annular groove along the bottom of the end cap to further seal the fuel valve inlet 50 against fuel leakage by sealing contact of the O-ring with the fuel valve seat 52 when the composite valve member 15 is biased downwardly in its fully seated or closed position.

the air valve element 16 includes an outer continuous seating ring 148 connected by a plurality of webs 150 to the central body of the valve element. The continuous ring has upper and lower movable air valve seats 154, 156 thereon for respective seating engagement with an upper stationary air valve seat 158 located on the upright wall 80 of the core member 79 and with a lower stationary air valve seat 160 located on the outer wall of conical section 82 of the core member.

Figure 2:
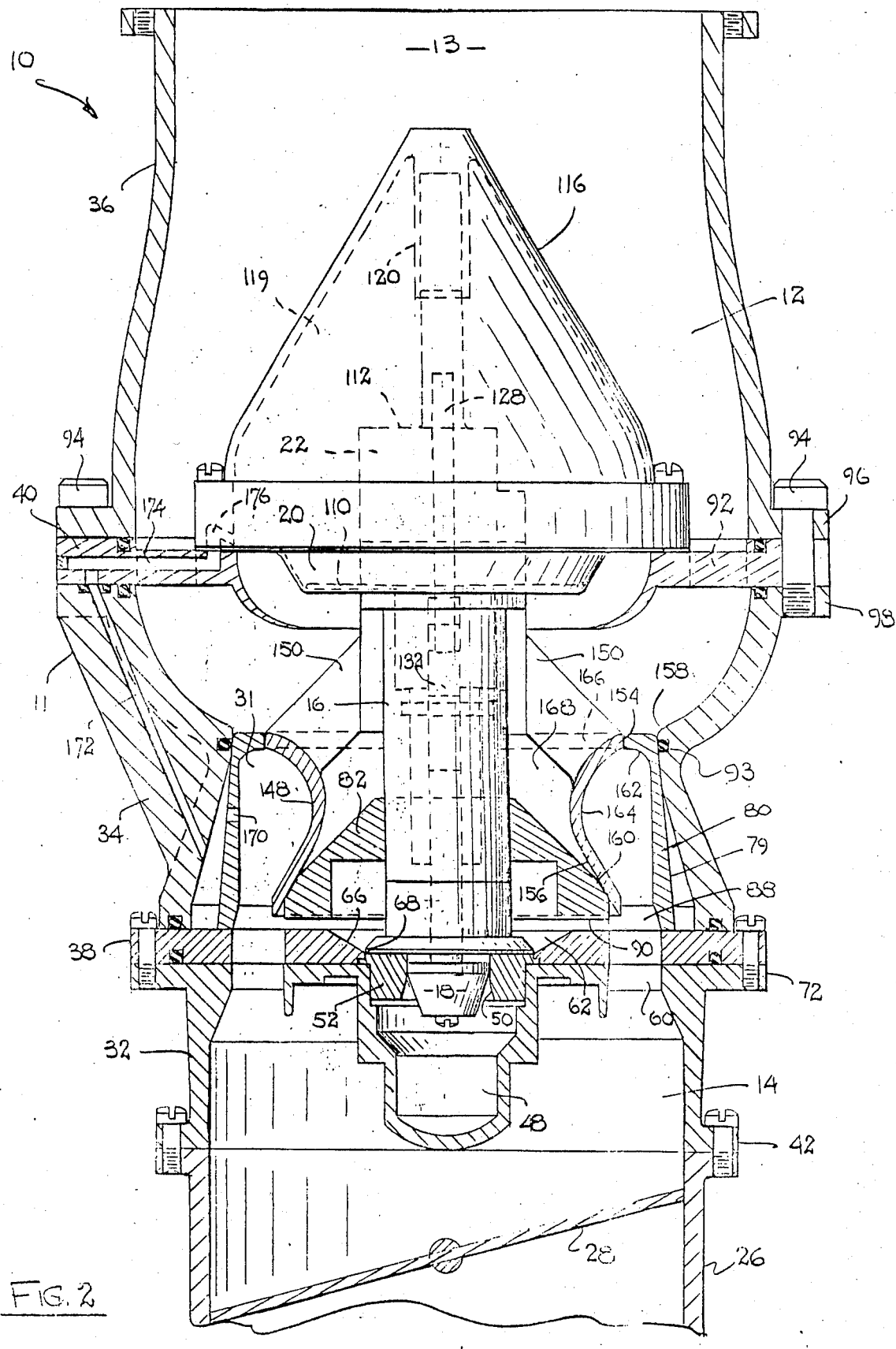
FIG. 2 is a side elevation, partially in cutaway axial cross-section, of the embodiment shown in FIG. 1 but with the air and gas valves in a closed position.

The movable air valve seats 154, 156 are designed to move toward and away from the respective upper and lower stationary air valve seats 158, 160 so as to make an operative seal when in a closed position as shown in FIG. 2 and to be spaced apart to permit air flow when in an open position as shown in FIG. 1. Therefore, the seats 154 and 156 are axially spaced apart from each other by the same distance as seats 158 and 160. As should be obvious, the stationary and movable air valve seats comprise elements of an air valve for controlling the flow of air through the air duct in the housing.

One and preferably both of the stationary seats 158, 160 has adjacent to it a wall which diverges therefrom. For example, the upright wall 80 of the core member 79 has a surface 162 which diverges outwardly from seat 158 as it extends downwardly. Also the outer wall of conical section 82 converges toward the center as it extends axially away from seat 160. Both sets of surfaces are not required, although they are convenient in providing optimum air flow with a minimum energy loss as the air passes though the air valve. However, at least one of these surfaces should be provided, and it preferably will be surface 162 in order that it can cooperate with a peripheral recessed wall 164 of the seating ring 148 of the air valve element 16. The advantage of recessed wall 164 can best be seen in FIG. 1 which illustrates the open position of the air valve, and it will be noted that in this position a first air passage 166 is formed between wall 164 and stationary seat 158 and a second air passage 168 is formed between stationary seat 160 and the inner wall of the seating ring 148 of the valve element 16. This latter wall also can be contoured for most effective air flow.

It will further be noted that the differences between the diameters of the seats are not great and therefore the differential pressure that must be overcome in order to actuate the valve is lower than in other mixing units where a large stopper-type air valve is used. For this reason, very large air flows can be accommodated with diaphragms having a diameter on the order of only 3 or 4 inches. Furthermore, it will be noted that a substantially complete opening is provided when the axial motion of the valve element is only about half its length. A travel of at least twice this length would be necessary to get the same air flow characteristics in conventional air valves. For this reason less total energy and less time are required to open the valve. Therefore, the valve is more responsive to small pressure changes and its response time is greatly decreased when compared to conventional constructions. The foregoing structure of the air valve is known and is more fully described in U.S. Pat. No. 3,545,948.

A pressure communication passageway for communication of a fluid pressure signal to the actuation chamber 119 above the diaphragm 20 is formed by a passage 170 in the upright wall 80 of the core member 79, by a passage 172 in the sidewall of the intermediate housing section 34, by a passage 174 in the diaphragm mounting plate 40, and by a passage 176 in the base of the cover 116 leading to the actuation chamber, all of the passages being in fluid communication with one another. An O-ring 178 is provied in a wall recess of passage 172 at its juncture with the passage 174 in the diaphragm mounting plate to seal the passages at the juncture. The actuation chamber receives a fluid pressure signal through the pressure communication passageway from the opening of passage 170 in the intermediate portion 31 of the air duct just below the upper opening of the air valve. The pressure at this point is a function of the air supply pressure (ambient or supercharged), of the velocity of the air past the opening 170, and, in the embodiment illustrated, also of the setting of the throttle valve and of the engine speed and load. These relate both to downstream pressures, and to the rate of flow in the intake manifold 24 (and thereby through the mixing device). However, the convenience purposes, the pressure at the opening of passage 170, and in the actuation chamber 119, will simply be referred to as a derivative of the intake manifold pressure.

The operation of the mixing device should now be easily understood in view of the foregoing. When the engine is inoperative, ambient air pressure is present in the actuation chamber and spring 124 causes the composite valve member 15 to move downwardly until it reaches its closed position, as shown in FIG. 2. In this position, the movable air valve seats 154, 156 are seated against the stationary air valve seats 158, 160, and the air valve comprised thereby is closed. Also the fuel valve head 18 is inserted within the fuel valve seat 52, and the end cap 134 is fully seated against the upper surface of the fuel valve seat to further seal the fuel inlet.

When the engine is to be started and fuel pressure is present at the fuel inlet, cranking of the engine with the throttle open will exert a negative pressure, or vacuum, in the actuation chamber via the pressure communication passageway, and air supply pressure is present at the bottom surface of the diaphragm. This will cause the diaphragm and the connected composite valve member 15 to move upwardly against spring 124 and open the fuel and air valves by lifting the fuel valve head 18 above the fuel valve seat 52 and the movable air valve seats 154, 156 above the stationary air valve seats 158, 160, as shown in FIG. 1. Air then flows through the air duct of the housing from the air inlet 13, through the space about the cover 116, through the air passages 91 in the diaphragm mounting plate, through the air passages 166, 168 on both sides of the seating ring 148, through the passages 88, 64 and 66 in the core member, spacer plate and base respectively, and finally through the discharge outlet 14. At the same time, fuel flows from the fuel inlet, through the space between the bottom 90 of the conical core section 82 and the spacer plate 38 into the air duct where it mixes with the air and flows with the air as an air/gas mixture through the passages 64, 60 in the spacer plate and base 32 and from there through the discharge outlet 14 into the adapter 26 and from there into the intake manifold of the engine. It should be well understood by those skilled in the art that depending on the pressure in the actuation chamber 119, which as explained is derived from the pressure in the engine intake manifold, the air and fuel valves can assume any number of intermediate positions (all collectively referred to as an "open" position) whereby an appropriate mixture for a given speed and engine load is provided.

The composite valve member 15 is returned by spring 124 to its closed position and the air and fuel valves are thereby closed whenever a negative or vacuum pressure signal from the air intake manifold is not present in the actuation chamber. This is a desirable safety factor in that the fuel inlet is thereby automatically closed whenever the engine is not in operation.

Advantageously, the degree to which the fuel valve is opened may be adjusted independently and together with the adjustment provided by the movement of the diaphragm 20 by the stepper motor 22 acting in response to a control signal from a feed back controller. The diaphragm and associated components may be conveniently considered to be a fluid motor or first actuator or actuator means and the stepper motor a second actuator or actuator means for the fuel valve. It should be understood that other actuating means can be provided in lieu of the fluid motor or stepper motor. A control signal from the controller to the stepper motor to reduce the fuel flow causes the motor to operate in a direction which moves the interconnected worm screw 128, connecting rod 132 and fuel head 18 downwardly to reduce the opening of the fuel valve and fuel flow. Movement is in an opposite direction when a control signal is sent to the motor to open the fuel valve and thereby increase the fuel flow. It should be obvious that the air fuel mixture discharged from the device will be dependent upon the opening of the fuel valve.

Figure 5:
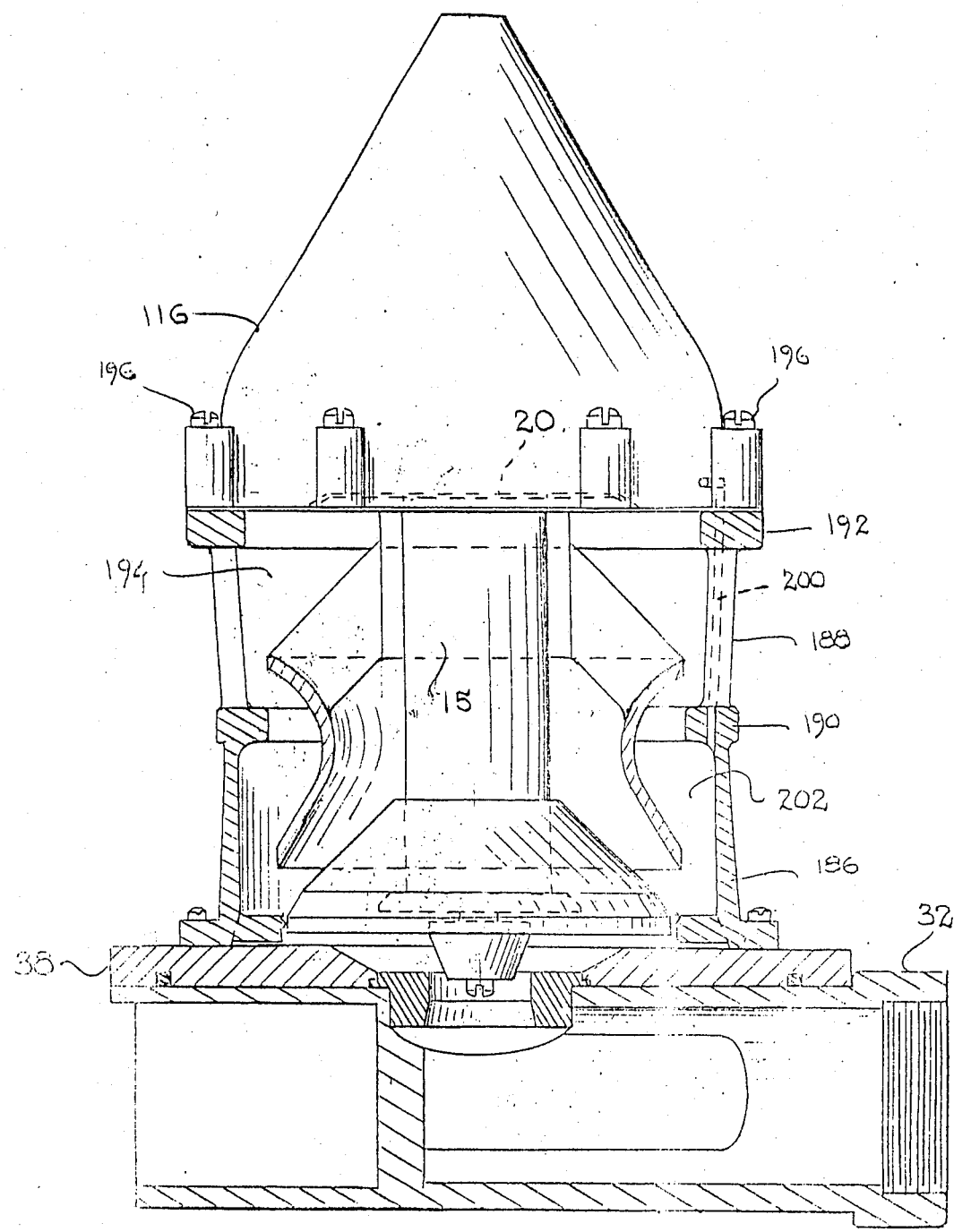
FIG. 5 is a side elevation, partially in cutaway axial cross-section, of the housing of the device arranged to receive air through the side of the housing.

An alternate housing of the air-gas mixing device is shown in FIG. 5. In this arrangement, the housing of the device is modified to provide an air inlet through the side of the housing instead of through the top of the housing when it is desirable to have a side entry because of space or other considerations. The alternate housing has a base 32, spacer plate 38, composite valve member 15, and an actuation chamber and cover 116 identical to the first embodiment Connected to the base 32 is a core member 186 that has a lower portion substantially identical to the removable core member of the first embodiment except that it has a plurality of posts 188 which extend upwardly from a flange 190 and which support a peripheral ring 192 at their upper ends. The posts are spaced apart and leave a substantially annular air inlet 194 between them. Air is therefore able to penetrate to pass to the inside of the flange 190 without impediment other than from the four posts which constitute only a relatively small restriction. The above construction is similar to that shown in U.S. Pat. No. 3,545,948 previously referred to.

The cover 116 is fastened to the ring 192 by screws 196 and a diaphragm 20, identical to that of the first embodiment, is clamped between the cover and the ring at its outer perimeter forming an actuation chamber between the diaphragm and the cover. A pressure communication passageway 200 for the passage of a fluid pressure to the vacuum chamber to activate the diaphragm is formed by a passage extending upwardly through flange 190, through one of the posts 188, through the ring portion 192 and sideways through the base of of the cover to provide fluid communication between the actuation chamber and an intermediate portion 202 of the air duct extending through the housing from the air inlet between the posts. Other structural features are the same as shown in the first embodiment.

The operative aspects of the device with the alternate housing arrangement are the same as described above for the first arrangement, except air enters through the side of the housing before passing downwardly through the air valve.

Figure 6:
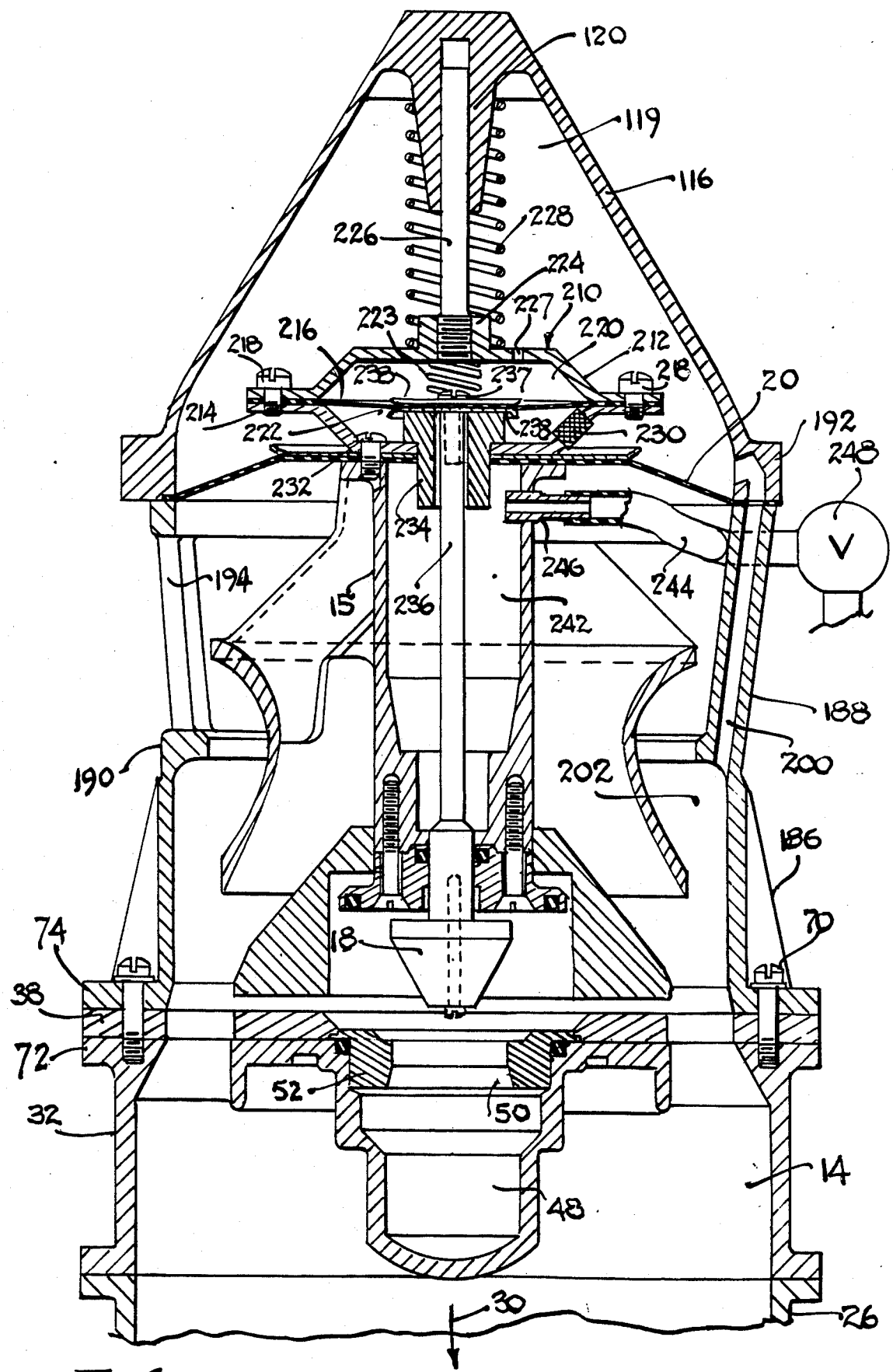
FIG. 6 is a side elevation, in cutaway axial cross-section, of a second embodiment of the invention, particularly suitable for being used with internal combustion engines in generator applications, with the fuel valve of the inventive device position for a lean air-fuel mixture.
Figure 7:
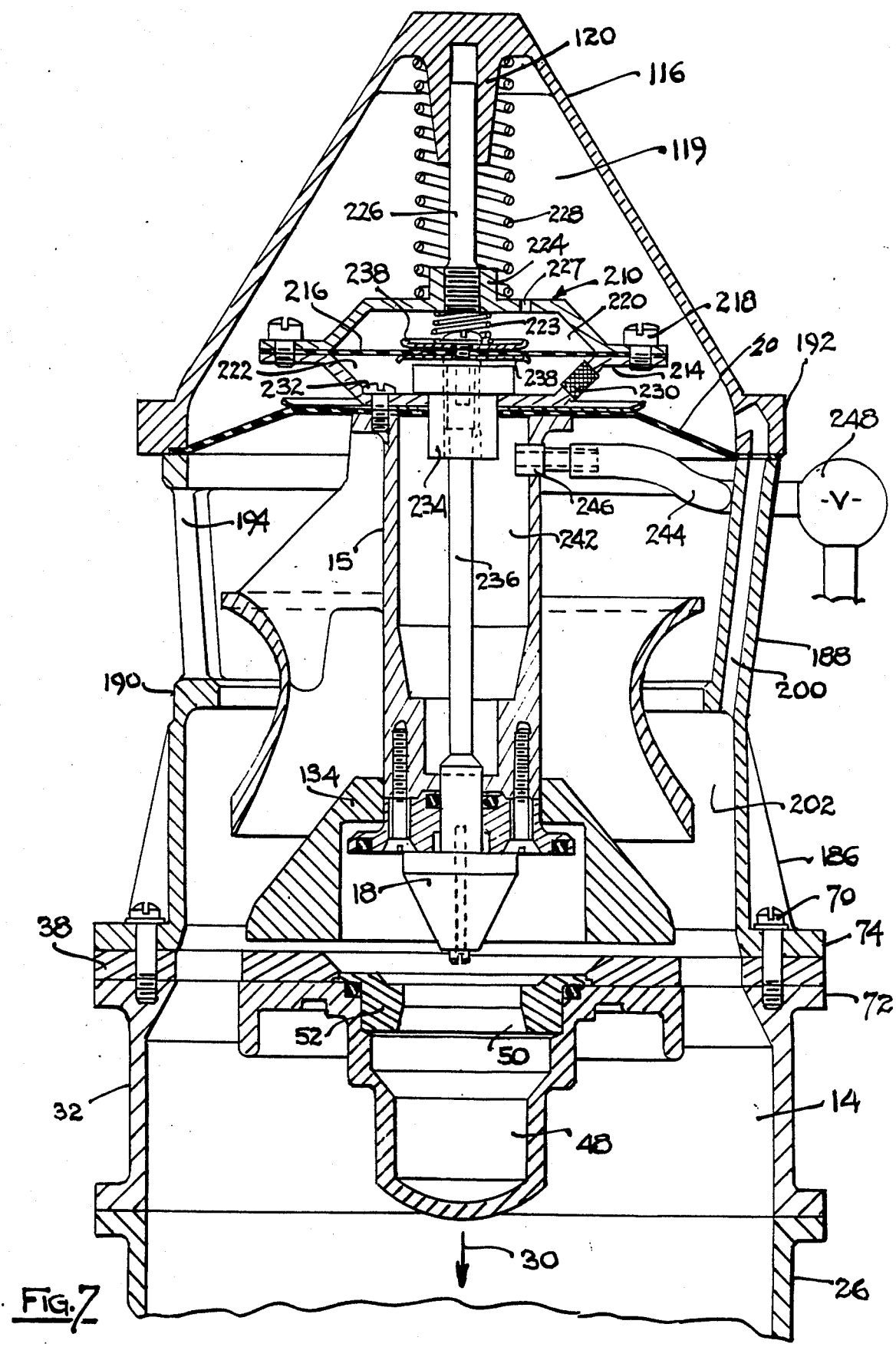
FIG. 7 is a side elevation, in cutaway axial cross-section of the embodiment shown in FIG. 6 with the fuel valve positioned for an enriched air-fuel mixture.

A second embodiment of the invention is shown in FIGS. 6 and 7. This embodiment of the device is particularly useful for installation on internal combustion engines used to drive generators and the like where it is desirable to operate the engine with a lean air-fuel mixture at constant speed under normal load conditions and to quickly enrich the fuel mixture upon sudden increases in load to prevent a significant reduction in engine speed. The device is shown in FIG. 6 with the fuel head in a downwardly retracted position for a lean air-fuel mixture under normal operating conditions and in FIG. 7 with the fuel head in a upwardly extended position which increases the fuel valve opening for an enriched air-fuel mixture upon a sudden increases in load demand.

In this embodiment, a second or supplemental fluid motor 210 replaces the stepper motor 22 disclosed in the previous embodiment and raises the fuel valve a fixed amount, as shown in FIG. 7, to enrich the air-fuel mixture when a fluid pressure control signal is applied to the fluid motor in response to an sudden increase in load demand. The second fluid motor may also be referred to as a second actuating means for the fuel valve. The second embodiment is shown with a housing arranged to receive intake air through the side of the housing as described in FIG. 5 of the first embodiment, but it should be understood that the second embodiment will perform equally as well with the housing arranged for air intake through the top of the housing as shown in FIGS. 1 thru 4 of the first embodiment. Except for the replacement of the stepper motor with the fluid motor 210, and complementary parts therefor, all of the components of the device are the same as that described for the first embodiment and such like components are given the same corresponding numbers in the following description. The fluid motor referred to in the first embodiment, comprising diaphragm 20 and its associated operating components, is also referred to hereafter as the first fluid motor or the first fuel valve actuator means for convenience in description.

The second fluid motor 210 is carried on diaphragm 20 of the first fluid motor to move with the diaphragm and comprises an enclosed chamber formed by an upper cover 212 and a lower cover 214. The second fluid motor includes a diaphragm 216, also referred to as the second diaphragm, sealed between the covers in a clamping relationship by screws 218 and separates the chamber into an upper chamber 220 and a lower pressure chamber 222 for receipt of a fluid pressure control signal. When a fluid pressure control signal is present in the lower pressure chamber 222 in response to a sudden increase in load demand, in a manner described below, the diaphragm 216 is extended outwardly, as shown in FIG. 7, which raises the fuel valve head 18 independently and relative to the movement of the fuel head by diaphragm 20 and increases the opening of the fuel valve. When the fluid pressure control signal is removed from the pressure chamber, a spring 223 returns the diaphragm to its initial retracted position shown in FIG. 6. The upper cover 212 has a central opening within a boss 224, and a guide pin 226 is fastened to the boss and extends into sleeve 120 of the actuation chamber cover 116 in a sliding relationship to assist in maintaining the fluid motor 210, together with the attached moveable components beneath it, along the axial centerline of the device as they are moved axially. A hole 227 is drilled in the upper cover 212 for communication of fluid flow between the upper chamber 220 of the second fluid motor and actuation chamber 119, within which the second fluid motor 210 is located, of the first fluid motor previously referred to. A spring 228 located between the fluid motor 210 and the actuation chamber cover 116 biases the composite valve member 15 and the connected fuel head downwardly toward a closed position to provide a positive shutoff for the fuel when the engine is inoperative, in a manner similar to that described for the operation of spring 124 of the first embodiment.

The lower cover 214 of fluid motor 210 has a sintered valve element 230, comprising a highly restrictive porous filter, provided in an opening in the sidewall of the cover as a vent for exhausting fluid pressure from the underside of the diaphragm 216 to permit a slow return of the diaphragm to its retracted downward position when the fluid pressure control signal is removed from the lower pressure chamber. The density of the sintered element 230 is selected to regulate the degree to which fluid can escape from the lower pressure chamber and to thereby regulate the rate of time it takes for the diaphragm and connected fuel valve head 18 to return to their downward retracted position.

The second fluid motor 210 is attached to the top of composite valve member 15 and diaphragm 20 by screws 232 extending through the lower cover, the diaphragm support plate 10 and into the top of the composite valve member 15.

A bushing 234 with a reduced lower portion is located within a central opening of the lower cover 214, the diaphragm back-up plate 110 and the underlying diaphragm 20. Slidably received within the bushing is a connecting rod 236, similar to connecting rod 132 of the first embodiment, connected to the fuel valve head 18 on one end and to the diaphragm 216 on the other end by screw 237. Two support plates 238 on each side of the diaphragm 216 support the diaphragm where it is connected to the connecting rod. The diaphragm 216 is connected to the fuel valve head 18 in a manner which permits the fuel head to be moved by the diaphragm 216 independently of the movement of the fuel valve head by diaphragm 20. Spring 223 urges the diaphragm downwardly against the upper surface of the bushing, which limits and defines the retracted downward position of the diaphragm 216 and connected fuel head 18. The bushing 234 is grooved to provide a passageway between the bushing and the connecting rod 236 for passage of a fluid pressure control signal into the lower pressure chamber 222 from the cavity or central core 242 within the composite valve member 15. The cavity 242 of the composite valve member 15 is arranged for communication with ambient air pressure, or with the turbocharged air in turbocharged engine applications, either of which comprises the fluid pressure control signal previously referred to, through a flexible hose 244 connected to a nipple 246 in the side wall of the valve member 15. A solenoid control valve 248 controls the passage of ambient air, or turbocharged air, through the hose and into the cavity.

The device is preferably used with an engine for driving a generator or the like, which normally runs at a constant speed in response to a speed control governor, and the degree to which the air and fuel valves are opened for established operating engine loads is predetermined to provide a lean air-fuel mixture during this speed for more efficient fuel control and emissions discharge. The device under normal operating conditions operates in a manner as described for the first embodiment, exclusive of those operative aspects attributed to the stepper motor. That is, a pressure signal in the actuation chamber 119 derived from intake manifold pressure of the engine acts on diaphragm 20 of the first fluid motor which in turn actuates the air and fuel valves to open the valves to a predetermined degree, dependent on throttle position and engine operating conditions, to provide a proper air fuel mixture. When a load is placed on the engine, the speed of the generator will be reduced and detected by the governor which will further open the throttle 28 for increased fuel flow to return the engine speed to its established rate. The opening of the throttle causes a decrease in the fluid pressure signal, derived from the intake manifold pressure of the engine, acting on diaphragm 20 which in turn lifts the diaphragm and the air and fuel valves and thereby increases the air and fuel flow. However, because the air and fuel valves are prearranged to provide a lean air-fuel mixture, when a sudden load is placed on the engine, the mixture is not sufficiently rich to overcome the intial change in load. Therefore it is necessary to quickly enrich the air-fuel mixture during the intial load increase to prevent a substantial reduction in engine speed and possible stalling of the engine, which is unacceptable in generator applications. This is accomplished by detecting changes in engine speed as an indicator of a change in engine load by a monitoring device, which for example may be the generator governor, and sending an electric signal to the electric solenoid valve 248 to open the solenoid valve when a material increase in engine load occurs. When the solenoid valve is opened, ambient air pressure enters the cavity 242 of the composite valve member and from there passes into the lower pressure chamber 222 of the second fluid motor 210 through the passageway between the bushing 234 and the connecting rod 236. The ambient air pressure acts as a fluid pressure control signal, which is higher than the pressure in actuation chamber 119 and therefore in upper chamber 220 above the diaphragm, and quickly raises the diaphragm 216 and connected fuel valve head 18 to their upwardly extended position. This further opens the fuel valve to increase the enrichment of the air fuel mixture. By proper selection of the of amount of travel of the fuel head, the engine can be kept from being enriched so much that detonation occurs.

In turbocharged engine applications, now shown, the solenoid valve 248 is connected by a conduit to the air inlet to the mixing device for receipt of the turbocharged air pressure as the fluid pressure control signal. This is because the pressure in chamber 119 and consequently in upper champer 220 that is acting on the diaphragm 216 will be higher in turbocharged applications. As should be easily understood, it is necessary that the fluid pressure control signal acting on the diaphragm 216 to raise the diaphragm must be higher than the fluid pressure acting on top of the diaphragm, together with the force created by spring 223, to lift the diaphragm.

When the engine returns to its normal operating speed after adjustment to the load increase and becomes stabilized by remaining there for a selected period of time, a signal is sent to the solenoid valve 248 to shut the valve and terminate the fluid pressure control signal. After the solenoid valve is shut off, the fluid pressure control signal is gradually removed from the lower pressure chamber 222 as fluid flows outwardly from the sintered valve element 230. As this occurs, diaphragm return spring 223 returns the diaphragm 216 together with the fuel head 18 to their retracted positions. The density of the sintered valve element is selected so that it will take approximately one to three seconds, depending on the particular application, for the fuel head to be completely retracted. This time delay is necessary to prevent fluctuations in the engine speed as the device returns to a lean air-fuel mixture, as would happen if the fuel valve head were to be quickly returned to its retracted position. This is because as the fuel valve head is lowered and the air-fuel mixture becomes leaner, the speed of the generator is reduced and the governor sensing the reduction in speed further opens throttle 28 to increase fuel flow. If this is done too quickly, more fuel than necessary will be delivered and the speed of the engine will have to be reduced by the governor by a reverse process. The cycle is then continuously repeated until the proper speed is obtained. This hunting is eliminated by dampening or slowing the return of the fuel head to its retracted position such that any change in the speed of the engine is hardly noticeable during the return movement.

Now that the invention has been described, it should be obvious that the invention device has a number of advantageous features. First, actuation of the air and fuel valves by the diaphragm 20 of the first fluid motor in response to intake manifold pressure of the engine adjusts the opening of the air and fuel valves to provide an effective air/fuel mixture under most engine operating conditions.

Secondly, with regard to the first embodiment, by use of the stepper motor, the opening of the fuel valve, and thereby the air/fuel mixture, may easily be further adjusted to compensate for different gaseous fuels by a remote electrical control signal, but yet allowing the fuel valve to be adjusted for changes in engine load conditions by the intake manifold pressure acting on the diaphragm. Also, when the stepper motor is used with a feedback controller, receiving inputs from speed, oxygen and other sensors measuring engine performance, a means is provided to monitor engine performance and vary the air/fuel mixture in response to actual engine performance to provide the most optimum engine air/fuel mixture. This results in better engine performance, fuel economy and pollution control. Adjustment of the air/fuel mixture by the stepper motor for differences in fuel or in response to a feedback control signal can be quickly accomplished as the fuel valve is already prepositioned in the approximate required location by the diaphragm 20.

The device of the second embodiment is particularly advantageously for operating engines driving generators and the like where it is desired to operate the engine with a lean air-fuel mixture during normal load conditions for better fuel economy and emissions control but yet being able to quickly enrich the mixture upon a sudden increase in engine load to prevent any falloff in engine speed or engine stalling. Importantly, this is accomplished in a simple but yet mot effective manner.

In both embodiments, because the fuel valve head and seat and are easily removable and may be substituted with others of different size or configuration, it is possible to form the most optimum orifices for the conditions involved without extensive modification of the device. Still, another advantage is that the nature and construction of the device, in both embodiment, is such that the device is extremely reliable, simple in operation easily disassembled for repair or modification in the field, and economically feasible to manufacture.

This invention is not to be limited by the embodiments shown in the drawings and described in the description which is given by way of example and not of limitation, but only in accordance with the scope of the appended claims.

I claim:

1. An air gas mixing device of the type used to mix gaseous fuel with air as an air/fuel mixture for discharge into an air intake conduit means of an internal combustion engine, comprising:

a housing having an air duct extending through the housing, the air duct having an air inlet and an air-fuel mixture discharge outlet downstream of the air inlet in the direction of fluid flow, the housing arranged to be connected to the air intake conduit means of the engine so that the discharge outlet of the air duct is in communication with said intake conduit means;

an air valve for controlling the rate of air flow through said air duct;

a primary fuel inlet in communication with said air duct for delivery of gaseous fuel for mixture with air flowing through said air duct;

a fuel valve for controlling the rate of fuel flow through said fuel inlet, the fuel valve having open and closed positions, and the rate of fuel being delivered through said fuel inlet being dependent on the degree to which said fuel valve is opened;

a first fuel valve actuator means automatically operated by a remote first fuel valve control signal for moving the fuel valve in an open position to a predetermined degree in response to the first fuel valve control signal; and a second fuel valve actuator means automatically operated by a remote second fluid pressure control signal in response to a sudden increase in engine load demand for increasing the opening of the fuel valve independently of the movement of the fuel valve by the first fuel valve actuator means whereby the fuel valve is opened to a predetermined degree by said first actuating means in response to said first control signal and the opening thereafter increased by said second actuating means in response to said second fluid pressure control signal to quickly enrich the air-fuel mixture upon sudden increases in load demand.

2. The device of claim 1 in which the second fuel valve actuator means is carried on said first fuel valve actuator means.

3. The device of claim 1 in which said first fuel valve actuator means comprises a first fluid motor.

4. The device of claim 3 wherein said first fluid motor includes a diaphragm connected to the fuel valve by a structural member for movement of the fuel valve by the diaphragm, the diaphragm arranged for exposure on one side to air pressure within the air duct and on the other side to a fluid pressure signal derived from fluid pressure in the air intake conduit means of the engine, and the fluid pressure signal being said first fuel valve control signal.

5. The device of claim 4 in which the second fuel valve actuator means includes a second fluid motor for increasing the opening of said fuel valve, and the second fluid motor being mounted to and movable with the diaphragm of the first fluid motor but connected to the fuel valve by a structural member in a manner which permits the fuel valve to be opened independently by said second fluid motor and relative to the movement of the fuel valve by the first actuating means.

6. The device of claim 5 wherein the second fluid motor includes a pressure chamber for intermittently receiving the second fluid pressure control signal, a second diaphragm forming one wall of the pressure chamber and arranged for exposure on one side to the second fluid pressure control signal, the second diaphragm having extended and retracted positions and being moved from its retracted position to its extended position when the second fluid pressure control signal is present in the pressure chamber, spring means for biasing the second diaphragm against movement caused by the second fluid pressure control signal and for returning the second diaphragm to its retracted position when the second fluid pressure signal is removed from the pressure chamber, and the second diaphragm being connected to the fuel valve by the structural member in manner such that the opening of the fuel valve is enlarged to provide an increase in fuel supply as the second diaphragm is moved from its retracted to extended position.

7. The device of claim 6 further including dampening means for dampening the return movement of the second diaphragm from its extended to retracted position when the second fluid pressure control signal is removed from the pressure chamber, and the dampening means comprising a sintered valve element in the wall of the pressure chamber for restricted fluid outflow from the pressure chamber.

8. The device of claim 7 further including stop means for defining the retracted position of the second diaphragm and said spring means urging said second diaphragm against said stop means.

9. The device of claim 8 further including an air valve actuator means for adjusting the opening of the air valve, the air valve actuator means and the first fuel valve actuator means comprising a common actuating means, and said common actuating means comprising said first fluid motor and the air valve and fuel valve being operatively coupled to and actuated in unison by the diaphragm of the first fluid motor.

10. The device of claim 9 further including biasing means for biasing said air valve and said fuel valve head toward their closed position.

11. An air gas mixing device of the type used to mix gaseous fuel with air as an air/fuel mixture for discharge into an air intake conduit means of an internal combustion engine comprising:

a housing having an air duct extending through the housing, the air duct having an air inlet and an air-fuel mixture discharge outlet downstream of the air inlet in the direction of fluid flow, the housing arranged to be connected to the air intake conduit means of the engine so that the discharge outlet of the air duct is in communication with said intake conduit means;

an air valve for controlling the rate of air flow through said air duct, the air valve having open and closed positions;

a primary fuel inlet in communication with said air duct for delivery of gaseous fuel for mixture with air flowing through said air duct;

a fuel valve head in operative arrangement with the fuel inlet for controlling flow of fuel through said fuel inlet, the fuel valve head having open and closed positions and the rate of fuel flowing through the fuel inlet being dependent on the degree to which the fuel head is opened;

said fuel inlet in fluid communication with said air duct for delivery of gaseous fuel for mixture with air flowing through the air duct;

said air valve and said fuel valve head being operatively coupled together;

a first actuator means automatically operated by a remote first control signal for moving the fuel valve head and air valve in an open position to a predetermined degree in response to the first control signal;

the first actuating means comprising a first fluid motor having a diaphragm connected to the fuel valve head by a structural member for movement of the fuel valve head by the diaphragm, the diaphragm arranged for exposure on one side to air pressure within the air duct and on the other side to a fluid pressure signal derived from fluid pressure in the air intake conduit means of the engine, the fluid pressure signal being said first control signal;

a second actuator means automatically operated by a remote second fluid pressure control signal in response to a sudden increase in engine load demand for increasing the opening of the fuel valve head independently of the movement of the fuel head by the first actuator means for enriching the air-fuel mixture;

the second actuator means including a second fluid motor, the fluid motor being mounted to and movable with the diaphragm of the first fluid motor, but connected to the fuel head by a structural member in a manner which permits the fuel head to be opened independently by the second fluid motor, the second fluid motor including a pressure chamber for receiving the second fluid pressure control signal, a second diaphragm forming one wall of the pressure chamber and arranged for exposure on one side facing the pressure chamber to the second fluid pressure control signal and on the opposite side to the fluid pressure control signal derived from the intake manifold pressure of the engine, the second diaphragm having a retracted and extended positions and arranged for being moved to its extended position when the second fluid pressure control signal is present in the pressure chamber, spring means for returning the second diaphragm to its retracted position when the second fluid pressure signal is removed from the pressure chamber, and the second diaphragm being connected to the structural member in a manner such that the opening of the fuel head is increased as the second diaphragm moves from its retracted position to its extended position; and biasing means for biasing said air valve and said fuel valve head toward their closed position.

12. The device of claim 11 further including dampening means for dampening the return movement of the second diaphragm from its extended to retracted position, the dampening means comprising a sintered element in the wall of the pressure chamber for restricted fluid outflow from the pressure chamber.

13. The device of claim 12 further including stop means for defining the retracted position of the diaphragm and said spring means urging said second diaphragm against said stop means.

14. A process for enriching an air/fuel mixture of an air-gas mixing device of the type having primary air and gas valves for supplying an air fuel mixture into a mixing chamber for discharge into an air intake conduit means of an internal combustion engine comprising the steps of automatically opening the air and gas valves with a first fluid motor to a predetermined degree in response to a first remote fluid pressure control signal and thereafter independently increasing the opening of the gas valve by a second fluid motor in response to a second fluid pressure control signal upon a sudden increase in engine load demand for obtaining an enriched air/fuel mixture.

15. A process as claimed in claim 14 wherein the second fluid motor is coupled to the first fluid motor and carried thereon.

16. A process as claimed in claim 14 further comprising opening the fuel valve and air valve in unison to a predetermined degree with said first fluid motor in response to the first fluid pressure control signal.

17. A process as claimed in claim 16 wherein the first fluid pressure control signal is derived from a fluid pressure signal from the intake manifold conduit means of the engine and the second fluid pressure control signal is derived from a higher pressure source.

* * * * *